(12) United States Patent
Colby

(10) Patent No.: US 7,719,425 B2
(45) Date of Patent: May 18, 2010

(54) RADIO FREQUENCY SHIELDING

(76) Inventor: Steven M. Colby, P.O. Box 52033, Palo Alto, CA (US) 94303

( * ) Notice: Subject to any disclaimer, the term of this patent is extended or adjusted under 35 U.S.C. 154(b) by 661 days.

(21) Appl. No.: 11/350,309

(22) Filed: Feb. 7, 2006

(65) Prior Publication Data

US 2006/0187061 A1    Aug. 24, 2006

Related U.S. Application Data

(60) Provisional application No. 60/758,751, filed on Jan. 13, 2006, provisional application No. 60/752,933, filed on Dec. 21, 2005, provisional application No. 60/715,641, filed on Sep. 10, 2005, provisional application No. 60/712,308, filed on Aug. 30, 2005, provisional application No. 60/700,884, filed on Jul. 19, 2005, provisional application No. 60/685,331, filed on May 27, 2005, provisional application No. 60/678,428, filed on May 6, 2005, provisional application No. 60/650,478, filed on Feb. 7, 2005.

(51) Int. Cl.
  *G08B 13/14* (2006.01)
(52) U.S. Cl. ............... 340/572.8; 340/572.1; 340/10.1; 340/10.3; 235/375; 235/380; 235/492
(58) Field of Classification Search ............ 340/572.1, 340/572.2, 572.3, 572.4, 572.7, 572.8, 539.1, 340/825.69, 10.1, 10.2, 10.3; 235/380, 383, 235/487, 492, 375; 343/702, 841
  See application file for complete search history.

(56) References Cited

U.S. PATENT DOCUMENTS

| 4,744,497 | A |   | 5/1988  | O'Neal et al. |
| 5,327,115 | A | * | 7/1994  | Swierczek ............... 340/309.7 |
| 5,538,291 | A |   | 7/1996  | Gustafson |
| 5,700,037 | A |   | 12/1997 | Keller |
| 6,158,777 | A |   | 12/2000 | Twardosz |
| 6,471,127 | B2 |  | 10/2002 | Pentz |
| 7,218,233 | B2 | * | 5/2007 | Bon ........................ 340/572.8 |
| 2002/0117243 | A1 |   | 8/2002  | Koren |
| 2003/0014891 | A1 |   | 1/2003  | Nelms |
| 2003/0057286 | A1 | * | 3/2003 | Yamagishi et al. .......... 235/492 |
| 2004/0089724 | A1 |   | 5/2004  | Lasch |
| 2004/0169087 | A1 |   | 9/2004  | Lasch |
| 2004/0237360 | A1 |   | 12/2004 | Nelms |
| 2004/0256469 | A1 |   | 12/2004 | Faenza, Jr. |
| 2005/0011776 | A1 |   | 1/2005  | Nagel |
| 2005/0171898 | A1 |   | 8/2005  | Bishop |
| 2005/0205665 | A1 |   | 9/2005  | Lasch |
| 2005/0274794 | A1 |   | 12/2005 | Bason |
| 2006/0005050 | A1 |   | 1/2006  | Bason |

(Continued)

OTHER PUBLICATIONS

Unknown www.walletgard.com/contact.html Revised Feb. 19, 2006.

(Continued)

*Primary Examiner*—Hung T. Nguyen

(57) ABSTRACT

Shielding is associated with RFID tags to achieve new systems and methods having various advantages. These systems include containers configured to store RFID enabled identity documents, the use of RFID tags to monitor the state of a container, and the inclusion of shielding in identity devices. Disclosed are shielded passports, driver's licenses, and the like. Some embodiments further including reading systems for reading identity devices comprising shielding and RFID tags.

8 Claims, 15 Drawing Sheets

U.S. PATENT DOCUMENTS

2006/0254815 A1* 11/2006 Humphrey et al. .......... 174/380
2007/0152829 A1* 7/2007 Lindsay et al. ........... 340/572.3

OTHER PUBLICATIONS

Unknown Foiling the Oyster Card, Spy Blog Feb. 16, 2004.
Schneier, Bruce RFID Passport Security Revisited. Aug. 9, 2005.
Schneier, Bruce The Security of RFID Passports. Nov. 3, 2005.
Yu, Roger Electronic passports set to thwart forgers, USA Today Aug. 8, 2005.
Unknown EMF Shielding & Conductive Fabrics www.lessemf.com/fabric.html printed Aug. 4, 2005.
Unknown Characteristics of Metal Shielding Textiles www.rfsafe.com Printed Aug. 2005.
Yoshida, Junko Tests reveal e-passport security flaw www.eetimes.com Aug. 30, 2004.
Unknown Information Security Radio Frequency Identification Technolgy in the Federal Government. GAO-05-551 May 27, 2005.
Goo, Sara Security Concerns Prompt Passport Redesign www.washingtonpost.com Apr. 30, 2005.
Moss, Frank Statement of Frank E. Moss, Committee on International Relations, wwwc.house.gov Jun. 23, 2004.
Unknown CDT Working Group on RFID: Privacy Best Practics for Deployment of RFID Technology www.cdt.org May 1, 2006.
Moss, Frank How the U.S. Passport Program Enhances Border Security travel.state.gov Jun. 22, 2005.
Paterson, Erik U.S. Issues First e-passports to diplomats, citizen issuance to start later in '06 Apr. 20, 2006.
Juels, Ari; Security and Privacy Issues in E-passports, SECURECOMM'05—vol. 00 2005) Sep. 5-9, 2005.

* cited by examiner

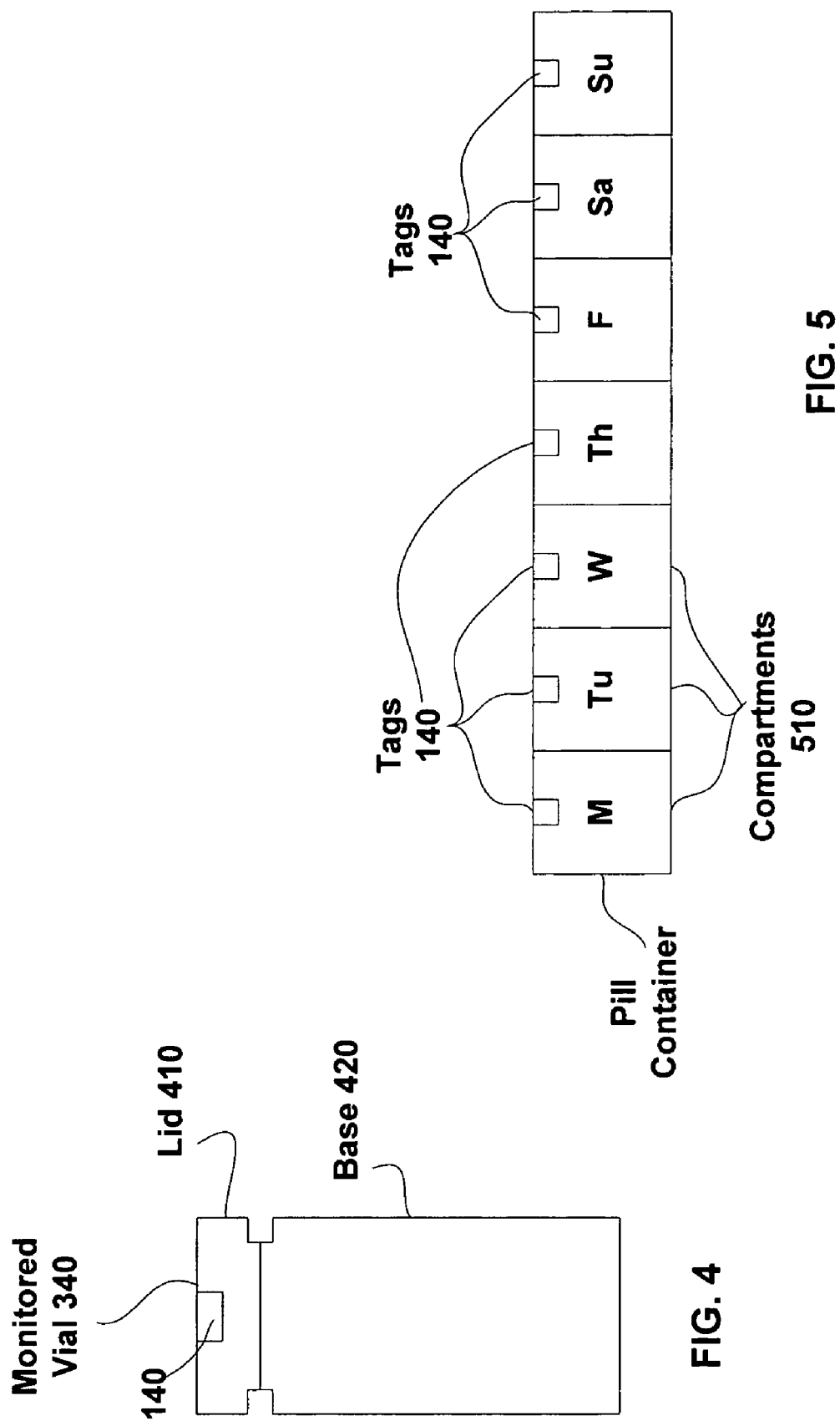

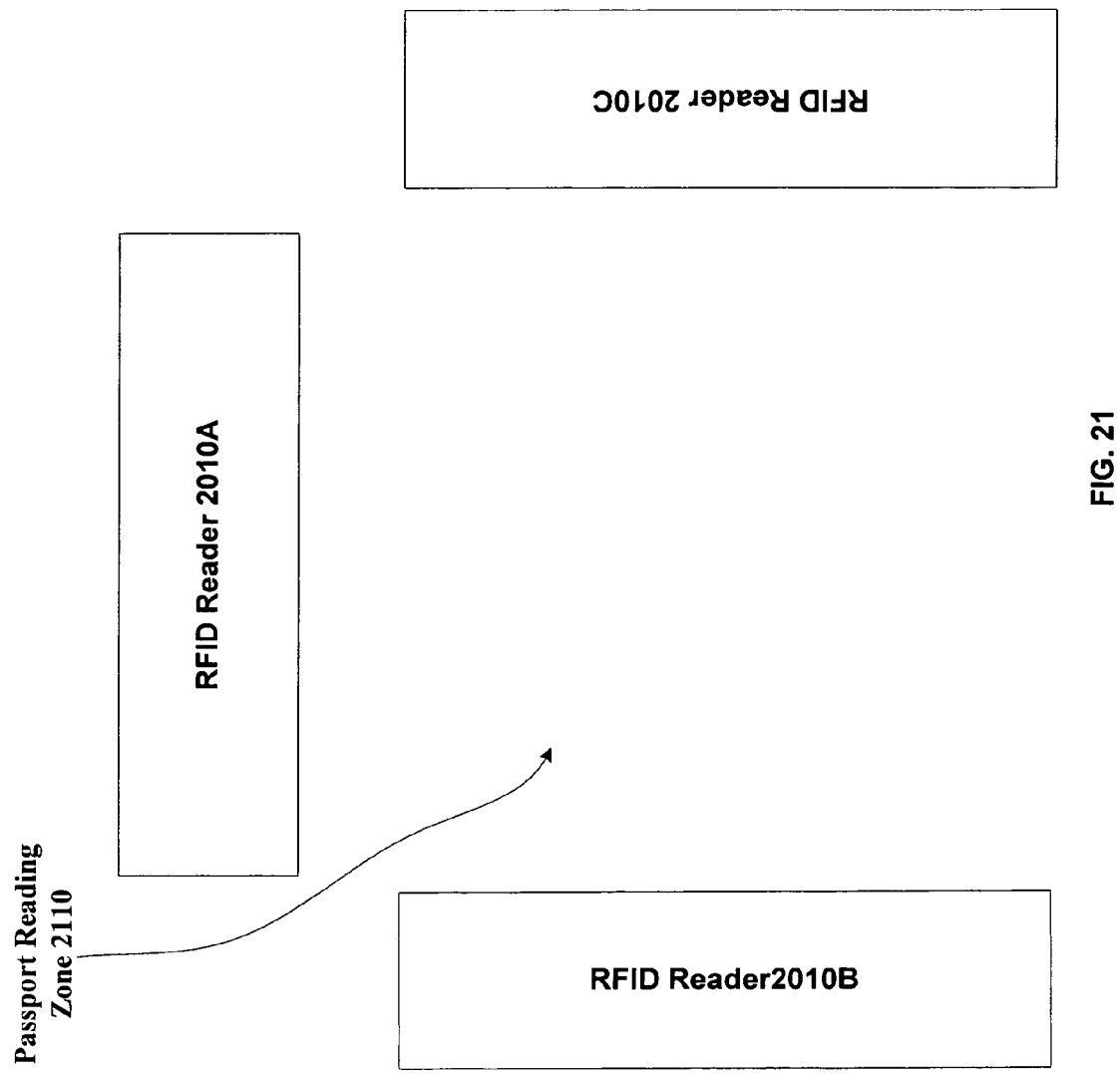

RADIO FREQUENCY SHIELDING

CROSS-REFERENCE TO RELATED APPLICATIONS

This application claims priority and benefit from commonly owned U.S. Provisional Patent Applications: No. 60/650,478 entitled "RFID Shielding," filed Feb. 7, 2005; No. 60/678,428 entitled "RFID device," filed May 6, 2005; No. 60/685,331 entitled "RF Powered Remote," filed May 27, 2005; No. 60/700,884 entitled "Electronically Switchable RFID," filed Jul. 19, 2005; No. 60/712,308 entitled "Passive radio frequency data logger," filed Aug. 30, 2005; No. 60/715,641 entitled "RFID applications," filed Sep. 10, 2005; No. 60/752,933 entitled "Multi-key FOB," filed Dec. 21, 2005; and No. 60/758,751 entitled "Multi-switch Credit Card," filed Jan. 13, 2006. The disclosures of these provisional patent applications are hereby incorporated herein by reference in their entirety.

This application is related to co-pending U.S. patent application Ser. No. 11/349,766 entitled "Containers Including Radio Frequency Shielding," and filed Feb. 7, 2006, and to co-pending U.S. patent application Ser. No. 11/350,185 entitled "Identity Devices Including Radio Frequency Shielding," and filed Feb. 7, 2006.

BACKGROUND OF THE INVENTION

1. Field of the Invention

The invention is in the fields of radio frequency identification (RFID) tags, and more specifically in the field of RFID tag shielding.

2. Description of Related Art

Radio Frequency identity (RFID) tags are, for example, typically small, flexible, and low profile devices that can be affixed to items for electronic tracking and information storage purposes. An RFID tag can be read by an RFID reader when the RFID tag is brought within a certain vicinity of the reader that is broadcasting a radio frequency signal. In some cases, once within that vicinity, the RFID tag receives sufficient power from the radio frequency signal to permit it to transmit a return radio frequency signal using the received power. These RFID tags are referred to as passive RFID tags. In other cases the RFID tag has an independent power source for generating a return radio frequency signal. These RFID tags are referred to as active RFID tags. With either passive or active RFID tags, the return radio frequency signal may include an encoded copy of information stored within the RFID tag. As RFID tags achieve more wide-spread use they will become ubiquitous on forms of identification, and be included in personal and business effects, such as passports, driver's licenses, keys, cell phones, PDAs, and so forth. For example, an RFID tag may be incorporated in a driver's license to store personal information about the licensee. As used herein, RFID tags include radio frequency contactless chips.

A problem with using RFID tags to store security, confidential and/or personal information is that an RFID reader can read any RFID tags that pass within its range. Even if data is encrypted, this creates a possibility of unauthorized access to the personal data and other information stored in the RFID tag, or at the least, detection of the presence of the RFID tag.

SUMMARY

The invention includes the use of shielding in relation to RFID tags. For example, some embodiments of the invention include shielded containers for storing devices including RFID tags. These devices can include identification devices such as passports, credit cards, or driver's licenses.

Some embodiments of the invention include shielded containers and RFID tags, the RFID tags configured for use in determining a state of the container. For example, detection of an RFID tag can be used to determine if the container is open or closed. These embodiments are optionally used in event logging or security.

Some embodiments of the invention include shielding attached to identification devices. This shielding may, for example, be included in a clamshell configuration, as a shielding insert, or as part of a page or cover.

Various embodiments of the invention include a container comprising an RFID tag configured for determining if the container is open or closed, and radio frequency shielding configured to shield a signal from the RFID tag responsive to whether the container is open or closed.

Various embodiments of the invention include a vehicle comprising a receptacle attached to the vehicle and configured to receive an identification device including an RFID tag, and a radio frequency shielding attached to the receptacle and configured to shield the RFID tag when the identification device is placed within the receptacle.

Various embodiments of the invention include a purse comprising a receptacle configured to receive an identification device including an RFID tag, and a radio frequency shielding attached to the purse and configured to shield the RFID tag when the identification device is placed in the receptacle.

Various embodiments of the invention include a wallet comprising a receptacle configured to receive an identification device including an RFID tag, and a radio frequency shielding attached to the wallet and configured to shield the RFID tag when the identification device is placed in the receptacle.

Various embodiments of the invention include a shielded RFID device comprising an identity device including an RFID tag, and a cover physically attached to the device, the cover including a radio frequency shielding material configured to shield the RFID tag in a first position and to not shield the RFID tag in a second position.

Various embodiments of the invention include an identification device comprising a base including a surface configured to display identifying information, an RFID tag configured to transmit identifying information, and a cover including a radio frequency shielding material configured to shield the RFID tag when closed and to allow the RFID tag to communicate with a reader when open.

Various embodiments of the invention include a passport device comprising an RFID tag configured to transmit identifying information, a surface configured to visually display the identifying information, and an attached cover including a radio frequency shielding material configured to shield the RFID tag when the cover is closed, and configured to enable reading of the RFID tag when the cover is open.

Various embodiments of the invention include a passport device comprising a first cover part including identifying information on an inside surface, a second cover part separated from the first cover part by a fold, an RFID tag within the first cover or the second cover part, and a page between the first cover part and the second cover part, the page including shielding configured for shielding the RFID tag in a first position and not shielding the RFID tag in a second position.

Various embodiments of the invention include a driver's license device comprising an RFID tag configured to transmit identifying information, a surface configured to visually display the identifying information, and a cover including a radio frequency shielding material configured to shield the RFID tag in a first position, and configured to enable reading of the RFID tag in a second position.

Various embodiments of the invention include a credit card device comprising an RFID tag configured to transmit account information, an attached cover including radio frequency shielding and configured to move relative to the RFID tag, to shield the RFID tag in a first position, and not to shield the RFID that in a second position.

Various embodiments of the invention include a shielding device comprising a shielding material configured to be temporally attached to an identity device and to shield an RFID tag within the identity device, and an attachment mechanism configured for attaching the shielding material to the identity device.

Various embodiments of the invention include a passport reading system comprising an RFID reader, and a base disposed to form a slot between the base and the RFID reader, a width of the slot configured for passage of a passport in an open position such that shielding material within the passport does not interfere with communications between the RFID reader and an RFID tag included in the passport.

Various embodiments of the invention include a passport reading system comprising a first RFID reader, a second RFID reader, a third RFID reader, the first, second and third RFID readers surrounding a passport reading volume and being disposed such that at least one of the first, second and third RFID readers will be at a proper angle relative to an antenna of an RFID tag within a passport in the passport reading volume to read the RFID tag, and also disposed such that transmission between the RFID tag and the at least one of the first, second and third RFID readers is not prevented by shielding within the passport when the passport is open in the passport reading zone regardless of the angle of the shielding relative to the first, second and third readers.

Various embodiments of the invention include a system comprising a cover material configured for inclusion in a polarity of identity devices, a strip of shielding deposited on the cover material, a first RFID tag deposited on the cover material, a second RFID tag deposited on the cover material, and a cutting area configured to be cut in order to produce the plurality of identity devices, the cut including cutting of the strip of shielding and separation of the first RFID tag and the second RFID tag.

Various embodiments of the invention include a passport comprising an RFID tag configured to transmit identifying information, a surface configured to visually display the identifying information, and a cover including a first part and a second part separated by a fold, the first part including the RFID tag and the second part including a radio frequency shielding configured to shield the RFID tag when the cover is closed, and configured to allow reading of the RFID tag when the cover is open, the radio frequency shielding including metallic fibers disposed within the second part.

Various embodiments of the invention include a passport comprising a first cover part including identifying information including a photograph on an inside surface, a second cover part separated from the first cover part by a fold, an RFID tag within the first cover or the second cover part, and a page between the first cover part and the second cover part, the page including shielding configured for shielding the RFID tag in a first position and not shielding the RFID tag in a second position.

Various embodiments of the invention include a passport comprising a first cover part including an RFID tag disposed at least 5 mm from a fold, a second cover part separated from the first cover part by the fold and including shielding configured for shielding the RFID tag in a first position of the second cover part and not shielding the RFID tag in a second position of the cover part.

Various embodiments of the invention include a system comprising a cover material configured for inclusion in a polarity of identity devices, a strip of shielding deposited on the cover material, a first RFID tag deposited on the cover material, a second RFID tag deposited on the cover material, and a cutting area configured to be cut in order to produce the plurality of identity devices, the cut including cutting of the strip of shielding and separation of a location for depositing of the first RFID tag and a location for depositing of the second RFID tag.

Various embodiments of the invention include a method comprising depositing a radio frequency shielding material on a first part of a cover material, depositing at least a first radio frequency identity tag and a second radio frequency identity tag on a second part of the cover material, cutting the cover material through the radio frequency shielding, and creating a fold in the flexible material, the fold separating the first part of the cover material from the second part of the cover material.

BRIEF DESCRIPTION OF DRAWINGS

FIG. 4 illustrates further details of an embodiment of the container of FIG. 2 that includes a monitored vial.

FIG. 5 illustrates another embodiment of a monitored vial that includes more than one compartment.

FIG. 20 illustrates an RFID reader system, according to various embodiments of the invention.

FIG. 21 illustrates an alternative RFID reader system, according to various embodiments of the invention.

DETAILED DESCRIPTION

Figure 2:
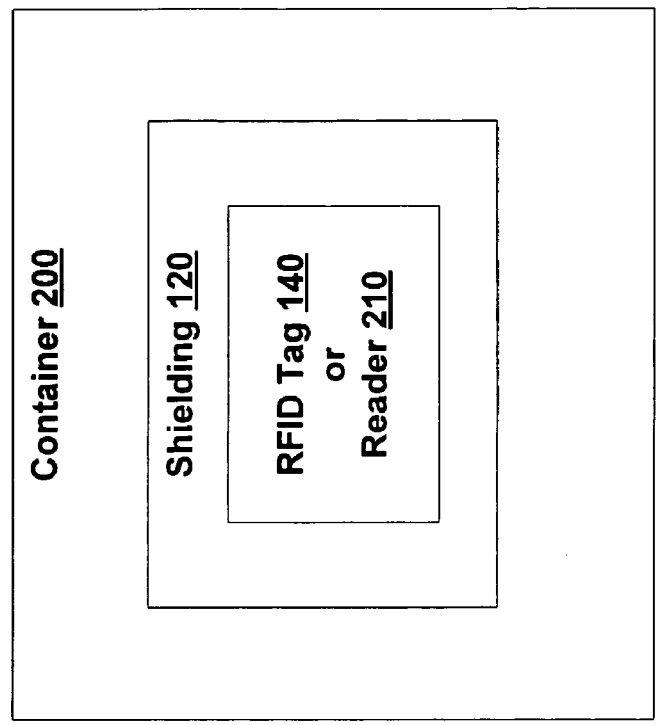
FIG. 2 illustrates a container including an RFID tag or alternatively an RFID tag reader.

Various embodiments of the present invention includes holders (e.g., containers) including radio frequency shielding materials to protect items, such as IDs (identification devices), incorporating RFID tags from being read. In some embodiments, a person can allow information within an RFID tag to be read by removing the item from the holder, while in other embodiments the holder is merely opened or removed to allow the RFID tag to be read. Replacing the item within the holder, or closing the holder, secures the item's RFID tag from unwanted readings from, or detection by, unknown or unauthorized RFID readers. It will be appreciated that items other than IDs, such as library books, consumer electronics, medications, and so forth, can also include, or be packaged with, RFID tags that a person may wish to shield from unauthorized RFID readers. Holders specifically tailored for such items, as well as general purpose holders such as wallets, purses and briefcases, can also include radio frequency shielding (also referred to herein as shielding) according to the present invention.

The holder can be in the general form of a container as an illustrative example, having two similar rectangular sides joined around three edges, being configured to be repeatedly opened and close, and optionally including a closure or flap along the fourth side. Such holders are well suited to the typical shape of most personal IDs such as passports, driver's licenses, green cards, credit and debit cards, medical information cards, insurance cards, medical alerts, student identification cards, security badges, immigration documents, or the like. Typically, the holder is configured to be repeatedly opened and closed to receive the ID.

The holder can also be a case such as a carrying-case for a cell phone or digital camera. The holder can also be a purse, suitcase, backpack, briefcase, satchel, glove compartment, a jewelry container, and the like. In some embodiments, the RF shielding is physically attached to the holder. The holder can alternatively include a checkbook holder, a wallet, a ticket holder, or a windshield visor pocket. Some embodiments of the invention are directed at articles of clothing in which one or more pockets include an attached radio frequency shielding material. Additional embodiments are directed to key holders.

The desirability of RFID shielding for the objects listed above will be readily appreciated. Being able to read an RFID tag on a green card (an immigration document) without the owner of the green card giving consent or being aware that the green card is being read, for example, can enable less scrupulous individuals to engage in improper behaviors. Incorporating RFID shielding into a wallet, purse, or other type of holder would prevent an RFID tag on an item within the holder from being read unless the item is deliberately exposed to the RFID reader, for instance, by removing the item from the holder. In view of the problem of identity theft, such shielding is desirable for credit cards with RFID tags, social security cards with RFID tags, driver's licenses with RFID tags, and so forth.

In some instances the RFID tag is essentially a label that has been attached to an object for inventory or similar purposes. Library books can carry RFID tags, for example. Accordingly, providing RFID shielding for various carrying devices, such as purses, suitcases, book bags, briefcases, and satchels can prevent RFID tags in library books and other objects from being read without permission. In other instances the RFID tag is more integral with an object. Consumer electronics, electronic media, and so forth, can be manufactured to include RFID tags inside of housings, on printed circuit boards, and on electronic components, for example. Often, such devices have specially designed cases such as cell phone cases and camera cases. These cases can also comprise RFID shielding to prevent the RFID tags in the associated devices from being read without authorization.

In some embodiments, the holder is clear (e.g., transparent) so that the ID, such as a driver's license, can be readily seen without having to be removed from the holder. Many wallets include either a plastic sleeve or a leather pocket with a plastic window for this purpose. In some embodiments, of the invention in which at least part of the holder is transparent, the shielding in the transparent region needs to also be transparent. Certain electrically conductive polymers can serve as the RFID shielding material in these embodiments. Other transparent and non-transparent materials for RFID shielding are discussed further herein.

In some embodiments, the holder is designed to allow the ID to be easily and repeatedly removed and returned. For instance, some credit and debit cards have a smaller format (mini-cards) and can be stored in a matching case that can serve as a fob for keys. In some of these embodiments, the holder and the ID card are pivotally attached to one another so that the ID card can flip out from the holder, and in still further embodiments a spring mechanism aids in extending and retracting the ID card. Other cases of the present invention can comprise a clamshell configuration. Such ID card holders of the present invention include an RFID shielding material.

The present invention also provides for articles of clothing designed to include pockets that can shield RFID tags on objects within the pockets. In these embodiments the articles of clothing can be made from a cloth that includes a radio frequency shielding material, or the pocket can be lined with the radio frequency shielding material.

The present invention also provides for key holders comprising RFID shielding. The keys that are held by such key holders can be either mechanical or electronic, where mechanical is used herein to refer to keys meant to fit into mechanical locks such as car keys, house keys, and the like. Electronic keys refer to keys that carry an encoded password on a magnetic strip, a bar code, an RFID tag, or the like. Either type of key can include an RFID tag as either a further component of the locking mechanism or for completely unrelated reasons. An RFID tag on a key is part of the locking mechanism, for example, when the lock reads the RFID tag for some purpose, such as to read the key numbers from RFID tags on different keys in order to track which keys are being used in the lock.

Electronic keys are often placed on ID badges and other forms of identification. An RFID tag with such electronic keys may carry confidential information but be unrelated to the lock mechanism. In some embodiments, the key holder is retractable, and in some of these embodiments the key holder is spring-loaded to automatically retract the key into the key holder.

In the embodiments described herein, the holder, whether an container, case, article of clothing, or key holder, has some form of opening through which the ID or other object having an RFID tag can be transferred. In some embodiments, the holder also includes a closure for closing the opening. In some of these embodiments, the closure can comprise a flap that closes over the opening. In other embodiments the closure is a zipper, Velcro, or related closure device. The closure can provide an electrical contact between opposing sides of the opening, in some instances.

In some embodiments, the RFID shielding material is incorporated into an ID. For example, a passport can include an RFID shielding material in the passport's cover so that an RFID tag within the passport can only be read when the passport is opened. Similarly, a driver's license can include a clamshell cover and base including an RFID shielding material, or a pivoting cover including an RFID shielding material.

The RFID shielding material can be provided in numerous different ways. The radio frequency shielding material can include a conductive material such as a metal or an electrically conductive plastic. The RFID shielding can be attached using adhesive. The radio frequency shielding material can include a mesh with a mesh size small enough to provide shielding against the radio frequency range used by RFID readers. The radio frequency shielding material can be laminated, either by laminating the RFID shielding material to another layer, such as a protective material layer, and/or by laminating together multiple layers of RFID shielding materials. In many embodiments the RFID shielding material is either flexible, transparent, or both. Examples of suitable RFID shielding materials include metal-coated elastomers such as aluminized Mylar and copper-coated plastic sheets and films. In some embodiments, the RFID shielding material is a semi-transparent mesh.

In some embodiments, the RFID shielding material is effective to form a Faraday cage around the ID, object, or key. Closing the closure can be effective to complete the Faraday cage, in some instances. In other embodiments the RFID shielding is used in selective locations in the holder. For example, where a nation's passport includes an RFID tag in a lower right-hand corner of the cover, passport holders designed for that nation's passports need only include RFID shielding above and/or below the location of the RFID tag when the passport is in the passport holder.

The RFID shielding shields an RFID tag from a reader in two ways. First, the RFID shielding greatly reduces the power being broadcast from the reader that reaches the RFID tag within the holder. This cuts the power available to the RFID tag to transmit information back. Secondly, even if the RFID tag receives enough power to transmit, the signal sent from the RFID tag is also attenuated. Accordingly, it will be appreciated that the effectiveness of the RFID shielding can be varied considerably based on choices of radio frequency shielding materials and their thicknesses, mesh sizes, and so forth. In some embodiments, the radio frequency shielding material provides a reduction of input power to the RFID tag by between about 5 db-30 db, 10 db-25 db, 15 db-20 db, or more than 15, 25, 35 or 45 db.

In some embodiments, the container is configured to be repeatedly opened and closed to receive an item including an RFID tag. In some embodiments, the container includes a closure configured to enhance the shielding.

In some embodiments, the container configured to just fit a standard California driver's license. These embodiments may be characterized by inner dimensions of less then 3.5 inches, 3.75 inches, 4 inches or 4.5 inches height, and less then 2.25 inches, 2.5 inches or 2.75 inches in width. In some embodiments, the container is configured to just fit a U.S. passport or a passport issued by another country. These embodiments may be characterized by inner dimensions of less then 5 inches, 5.25 inches, 5.5 inches or 6 inches in height, and less than 3.5 inches, 3.75 inches, 4 inches or 4.5 inches in width.

Figure 1:
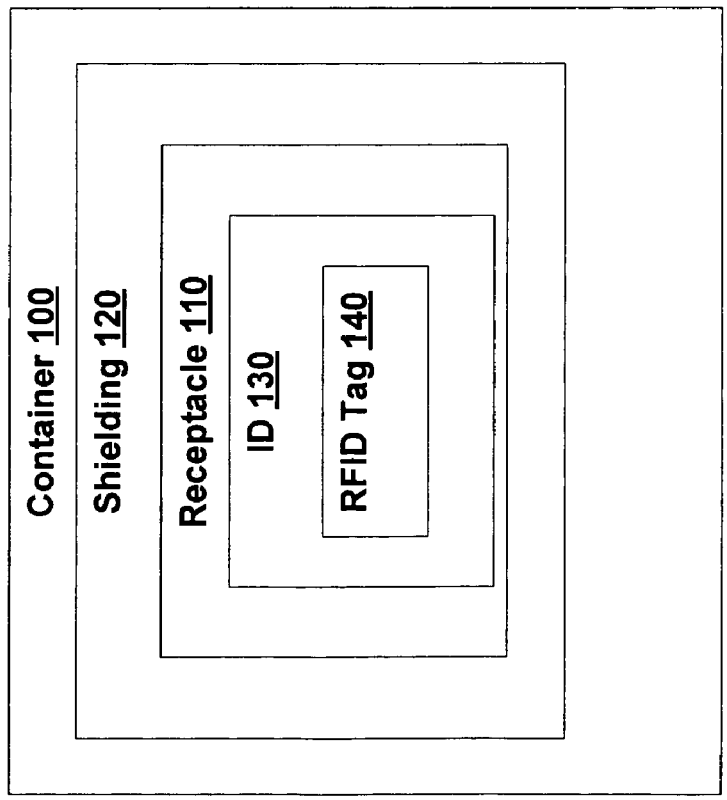
FIG. 1 illustrates a container including a receptacle configured to store an ID incorporating an RFID tag, according to various embodiments of the invention.

FIG. 1 illustrates a Container 100 including a Receptacle 110 configured to store an ID 130 (identification device) incorporating an RFID Tag 140. The Container 100 and Receptacle 110 may include a wallet, purse, passport holder, key chain, ticket holder, pocket, sleeve, slot, opening, niche, compartment, lid & base, glove compartment, jewelry, suitcase, backpack, bag, carrier, carton, box, sack, carton, casing, shell, carapace, covering, sheath, or the like. Container 100 further includes attached Shielding 120 configured to attenuate the transmission of radio frequency signals to or from the RFID Tag 140. Receptacle 110 is configured to be repeatedly opened and repeatedly closed for insertion and removal of ID 130.

FIG. 2 illustrates an embodiment of a Container 200 including RFID Tag 140 or alternatively an RFID tag Reader 210. Container 200 is optionally an embodiment of the Container of FIG. 1, and visa-versa. Container 200 further includes Shielding 120 configured to attenuate the transmission of radio frequency signals to or from the RFID Tag 140 or Reader 210. The shielding effect of the Shielding 120 is optionally dependent on a state of the Container 200. For example, in some embodiments, the Shielding 120 may be more efficient at attenuating RF transmission when Container 120 is closed than when it is open. As such, in some embodiments, the state of the Container 200 may be determined by a magnitude of a detected radio frequency signal between RFID Tag 140 and Reader 210 either of which may be within Container 200.

Figure 3:
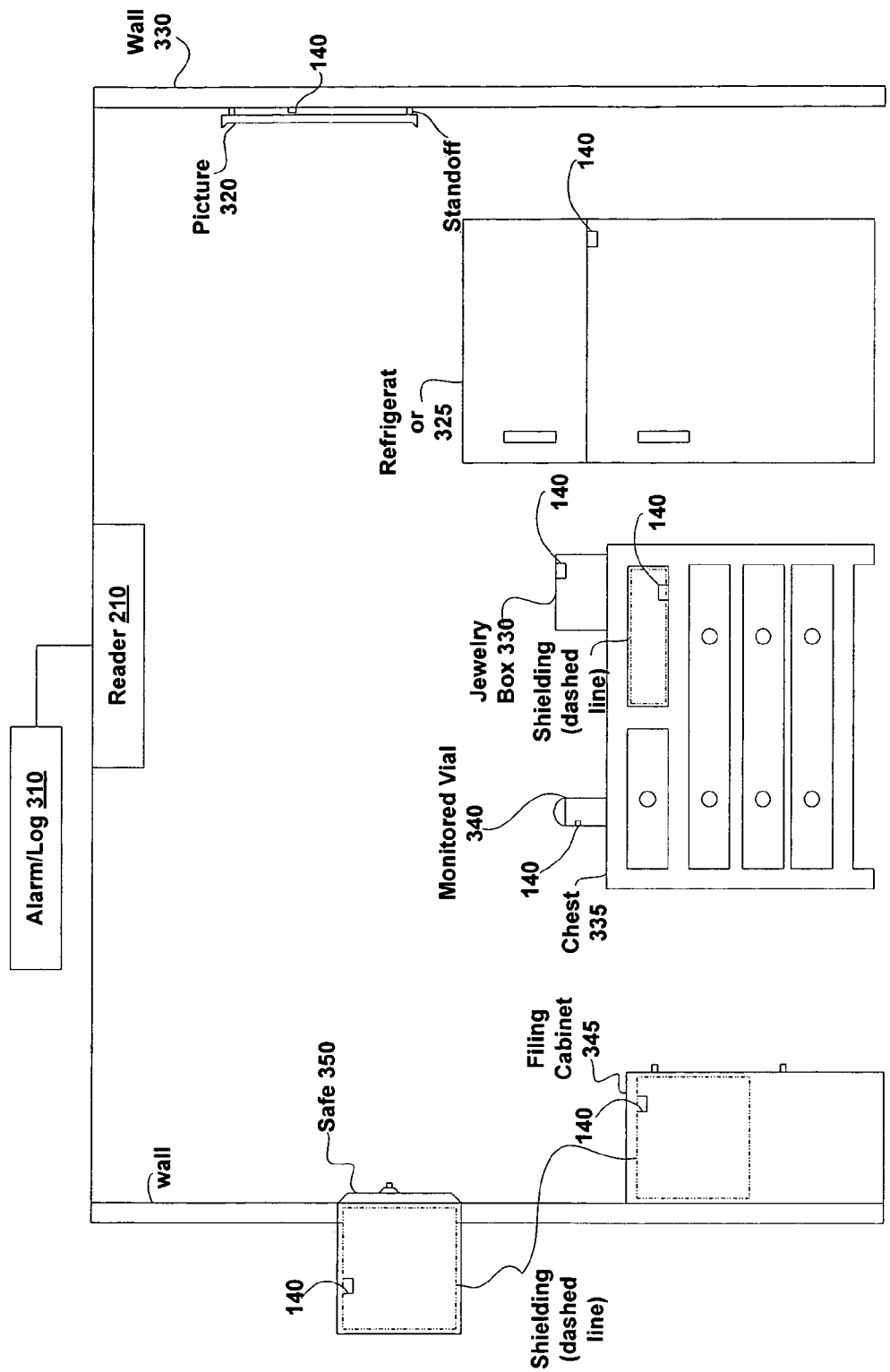
FIG. 3 illustrates various monitoring systems that employ illustrative embodiments of the container of FIG. 2.

FIG. 3 illustrates various monitoring systems that employ illustrative embodiments of Container 200. These illustrative embodiments include a wall hanging (e.g., a Picture 320), a Refrigerator 325, a Jewelry Box 330, a Chest of Drawers 335, a Monitored Vial 340, a Filing Cabinet 345, and a Safe 350. In these embodiments, the monitoring systems further include RFID tag Reader 210 and optional Alarm and/or Log 310. Each of these examples of Container 200 include one or more RFID Tag 140 and Shielding 120 (whether shown or not) configured to modify the transmission of RFID signals from Reader 210 to RFID Tags 140 responsive to a state of the Container 200.

For example, the Picture 320 illustrated includes Shielding 120 (not shown) that surrounds the RFID Tag 140 while Picture 320 is mounted on Wall 330. Shielding 120 is configured such that the attenuation effect of the shielding will be reduced if Picture 320 is removed from Wall 330. For example, Shielding 120 may be disposed to form a Faraday cage around or interfere with the RFID Tag 140 (e.g. be on the back of the picture, optional standoffs, and/or wall) and if Picture 320 is removed from Wall 330 a resulting gap, or reduction in interference, will allow increased RFID signal transmission between the associated RFID Tag 140 and Reader 210. Picture 320 may alternatively be a statue or some other object designed to sit on a surface with an RFID tag between the object and the surface.

In a similar manner each of the Refrigerator 325, Jewelry Box 330, Chest 335, Monitored Vial 340, Filing Cabinet 345 and Safe 350 includes Shielding 120 configured such that a magnitude of an RFID tag signal received by Reader 210 is dependent on whether the particular container is open or not.

Reader 210 is configured to detect RFID signals from one or more of the RFID Tags 140 and to generate a responsive output signal. In some embodiments, this responsive output signal is a quantitative or qualitative indication of the state of one or more of the containers. The reader is optionally configured to distinguish the signals received from each of the one or more RFID tags and, thus, identify which of the containers is open.

Alarm/Log unit 310 is optionally an alarm system or a logging system configured to activate an alarm or log an event responsive to the output signal of Reader 210. For example, in some embodiments, the Alarm/Log unit 310 is configured to activate an alarm when Picture 320 is removed from the wall or Safe 350 is opened. In some embodiments, the Alarm Log unit 310 is configured to log when Filing Cabinet 345, Chest 335 or Drawers or Refrigerator 325 is opened.

In alternative embodiments, Reader 210 may be placed within the container and RFID Tag 140 outside.

FIG. 4 illustrates further details of an embodiment of the Container of FIG. 2 that includes Monitored Vial 340. Monitored Vial 340 includes shielding in a Lid 410 and/or Base 420. When the Lid 410 and Base 420 are attached the shielding attenuates any signal from the enclosed RFID Tag 140. When Lid 410 is opened the attenuation is reduced. The RFID tag is optionally disposed on the underside of Lid 410. The illustrated embodiments are optionally used to monitor the use of medication or other material stored within Monitored Vial 340. The monitored vial is optionally an alternative form of Container 200 and optionally configured to store alternative types of goods. In some embodiments, Reader 210 of FIG. 3 is configured to log when Monitored Vial 340 is opened and closed. For example, if a user has a medication that should be taken at a specific time Reader 210 may be used to detect if Monitored Vial 340 is opened at these times and activate a reminder using Alarm/Log 310 if Monitored Vial 340 is not opened at a time medication should be taken.

FIG. 5 illustrates another embodiment of Monitored Vial 340 that includes more than one Compartment 510. Each Compartment 510 includes a separate RFID Tag 140 that may be separately identifiable using Reader 210. This embodiment may be used, for example, to monitor an activity that should occur at a variety of different times (e.g., times of day or days of the week.).

Figure 6:
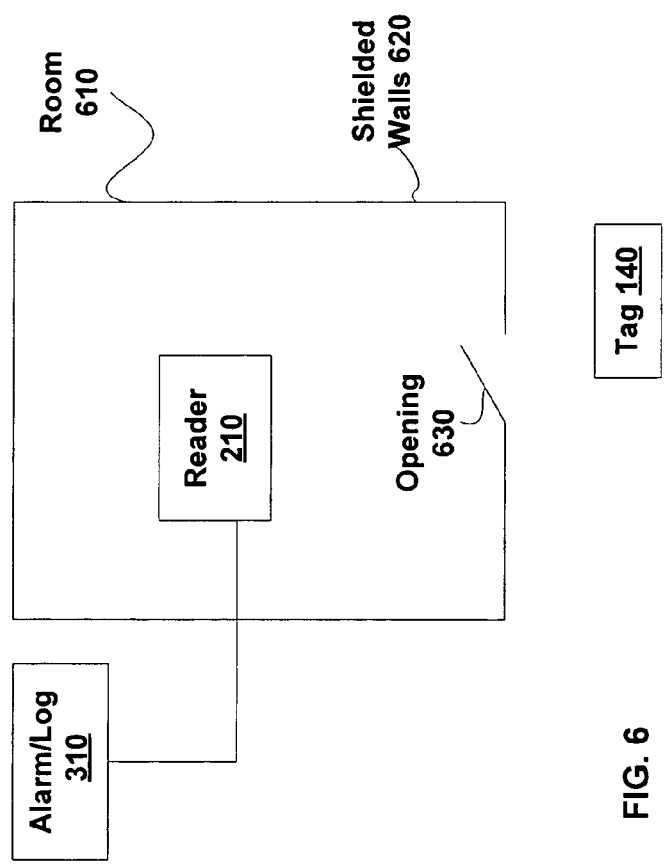
FIG. 6 illustrates an embodiment of the container of FIG. 2 wherein the container is a room.

FIG. 6 illustrates an embodiment of the Container of FIG. 2 wherein Container 200 includes a Room 610. In these embodiments, radio frequency signals between RFID Tag 140 and Reader 210 may be used to determine if an opening to the room is open. Room 610 includes Shielded Wall(s) 620 that block radio frequency signals between Tag 140 and Reader 210 when an Opening 630 is closed. When Opening 630 is open Tag 140 can be detected by Reader 210 and this stage can be logged by Alarm/Log 310. While the illustration shows Reader 210 within Room 610 and RFID Tag 140 outside, these positions are optionally exchanged. Room 610 is optionally a shipping container. RFID Tag 140 is optionally mounted on Opening 630 such that Tag 140 is brought within reading range of Reader 210 when Opening 630 is opened. Opening 630 can be, for example, a window or door.

Figure 7:
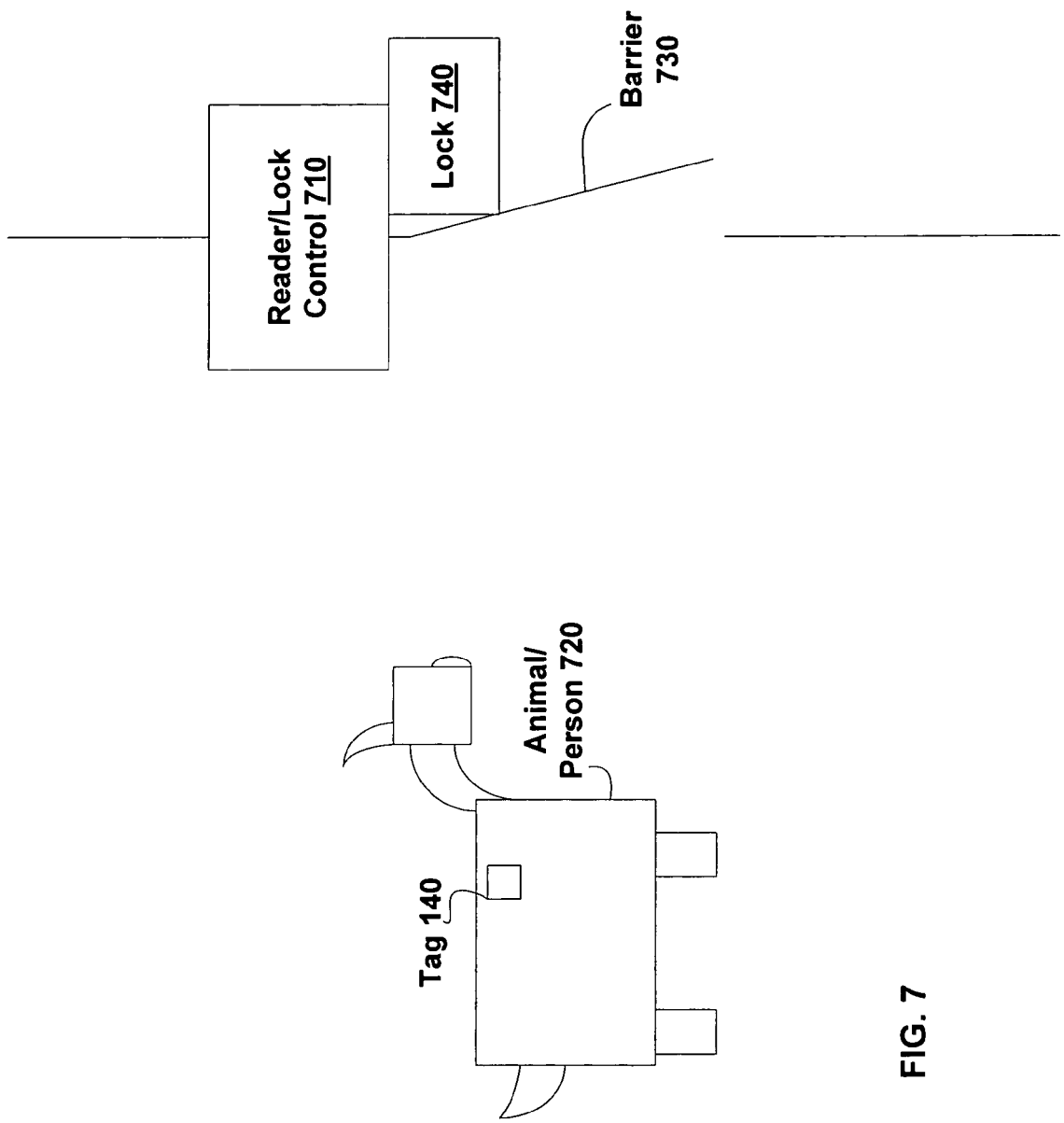
FIG. 7 illustrates an access system based on an RFID tag, according to various embodiments of the invention.

FIG. 7 illustrates an access system based on an RFID Tag 140. RFID Tag 140 is optionally implanted within a Animal or Person 720 or attached to an animal collar. A Reader/Lock Control 710 is configured to detect a signal from RFID Tag 140 and to control a Lock 740 in response. Lock 740 controls the function of a Barrier 730, such as a door or gate. Reader/Lock Control 710 is optionally programmable to operate responsive to particular instances of RFID Tag 140.

The Reader/Lock Control 710 illustrated in FIG. 7 is optionally used in the following manner. RFID Tag 140 is placed within or attached to the Animal or Person 720. Reader/Lock Control 710 is placed in a programming mode. A serial number of the RFID Tag 140 is programmed into the Reader/Lock Control 710 either by digital data entry or communication, or by bringing the RFID Tag 140 within the reading range of the Reader/Lock Control 710, such that the serial number can be read from the RFID Tag 140. The Reader/Lock Control 710 in placed in a normal operation mode wherein it monitor's for the presence of the RFID Tag 140. The RFID Tag 140 is detected by the Reader/Lock Control 710. The serial number is read from the detected RFID Tag 140 by Reader/Lock Control 710. Reader/Lock Control 710 compares the read serial number with the serial number programmed into the Reader/Lock Control 710 while in the programming mode. If the read and programmed serial numbers agree Lock 740 is activated in response. Activation of Lock 730 controls (e.g., locks or unlocks) access through Barrier 730. After the detected RFID tag is no longer detected by the Reader/Lock Control 710, Reader/Lock Control 710 optionally reactivates Lock 740 to return it to a previous state.

Figure 8:
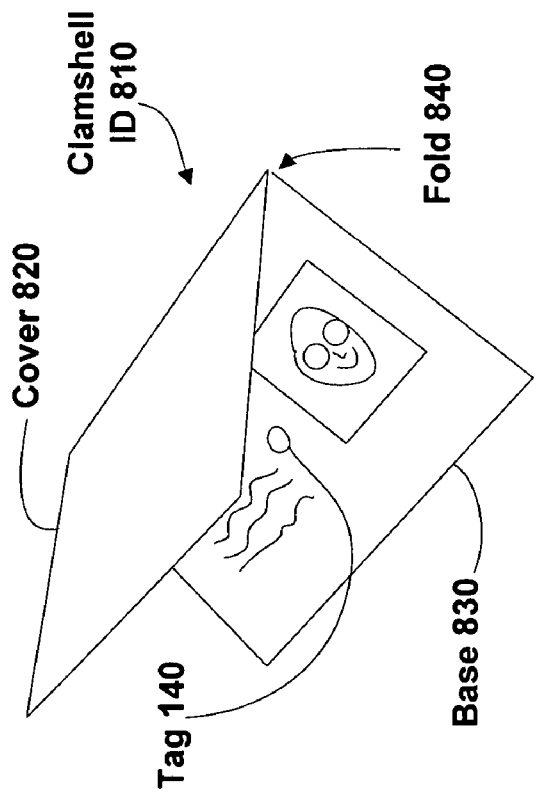
FIG. 8 illustrates a clamshell ID including a base including an RFID tag and a cover connected to the base, according to various embodiments of the invention.

FIG. 8 illustrates a Clamshell ID 810 (e.g. greencard (immigration card), passport, driver's license, transaction card, key card, national identity card, or the like). Transaction cards include credit cards, debit cards, check cards, payment cards, fare (e.g., transit) cards, or the like. Clamshell ID 810 includes an optional picture, a Base 830 including an RFID Tag 140, and a Cover 820 connected to Base 830 in a clamshell configuration, e.g., connected along an edge or Fold 840. Cover 820 and/or Base 830 include RFID shielding configured to attenuate radio frequency signals to or from RFID Tag 140 when Cover 820 is closed (e.g., shut), and to not attenuate, or attenuate to a lesser extent, radio frequency signals to or from RFID Tag 140 when Cover 820 is open. The shielding is optionally laminated into Base 830 and/or Cover 820. In some embodiments, Clamshell ID 810 includes shielding in both Base 830 and Cover 820. Base 820 can be the cover of a passport or other document. In some embodiments, Base 830 includes a plastic card.

In various embodiments, Clamshell ID 810 includes a passport, driver's license, credit card, etc. that includes RF shielding in one part (e.g., a page or cover) and an RFID tag in another part (e.g., a different page or cover). Not shown in FIG. 8 are pages that may be included between the covers (e.g., Base 830 and Cover 820). The RF shielding and RFID Tag 140 are configured such that, when Clamshell ID 810 is closed the shielding interferes with the RF pickup of the RFID tag to an extent sufficient for reading of RFID Tag 140 to be attenuated.

In some embodiments, Clamshell ID 810 can be closed in two ways. First, such that a picture and/or other identification information is displayed on the exposed surface of Base 830. Or, second, such that the picture and/or other identification information are covered by Cover 820. These two methods of closure are achieved by rotating Cover 820 and Base 830 relative to each other in different directions around Fold 840. In the first instance, the picture and/or other identification information can be used for identification while RFID Tag 140 is still shielded. Thus, Clamshell ID 810 can be used for identification (non-RFID) without unshielding RFID Tag 140.

When the Clamshell ID 810 is open, the shielding is less close to RFID Tag 140 and, thus, the interference of the shielding is reduced and RFID Tag 140 can be read. The shielding does not necessarily form a Faraday cage around RFID Tag 140 when Clamshell ID 810 is closed. In some embodiments, shielding is not included in the part of Clamshell ID 810 that includes the RFID Tag 140. Clamshell ID 810 is optionally formed by laminating RFID Tag 140 and RF shielding between layers of Cover 820 or to a page disposed between Cover 820 and Base 830. Further visible information such as a name and/or photograph can be placed on any surface of the Clamshell ID. Thus, in some embodiments, this visible information is visible when the Clamshell ID is open or closed. In other embodiments, this visible information is visible only when the Clamshell ID is open.

Figure 9:
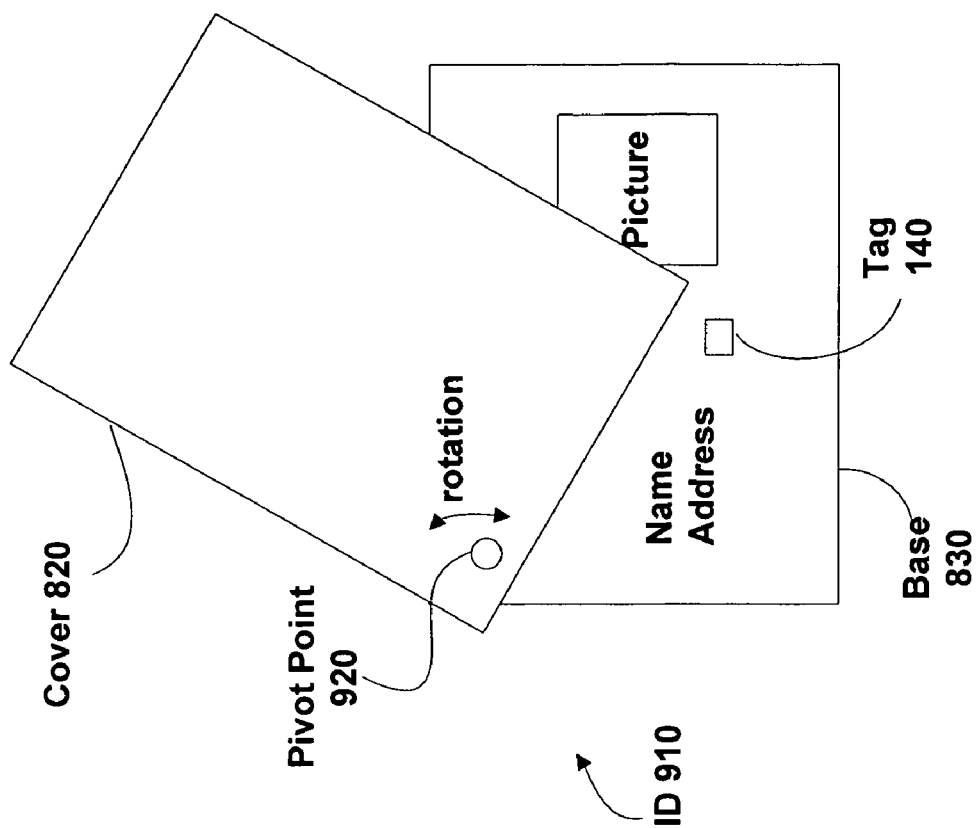
FIG. 9 illustrates a clamshell ID similar to that shown in FIG. 8 except that the base and cover are pivotally connected at a point rather than along an edge, according to various embodiments of the invention.

FIG. 9 illustrates an ID 910 similar to that shown in FIG. 8 except that Base 830 and Cover 820 are pivotally connected at a Pivot Point 920 rather than in a clamshell configuration. Cover 820 is configured to rotate over Base 830 as shown. When Cover 820 covers the Base 830 the RFID Tag 140 is shielded. When Cover 820 is rotated away from Base 830 RFID Tag 140 is unshielded. In some embodiments, Cover 820 may have two sections between which Base 830 fits. Either Cover 820 and/or Base 830 can include the RF shielding.

Figure 10B:
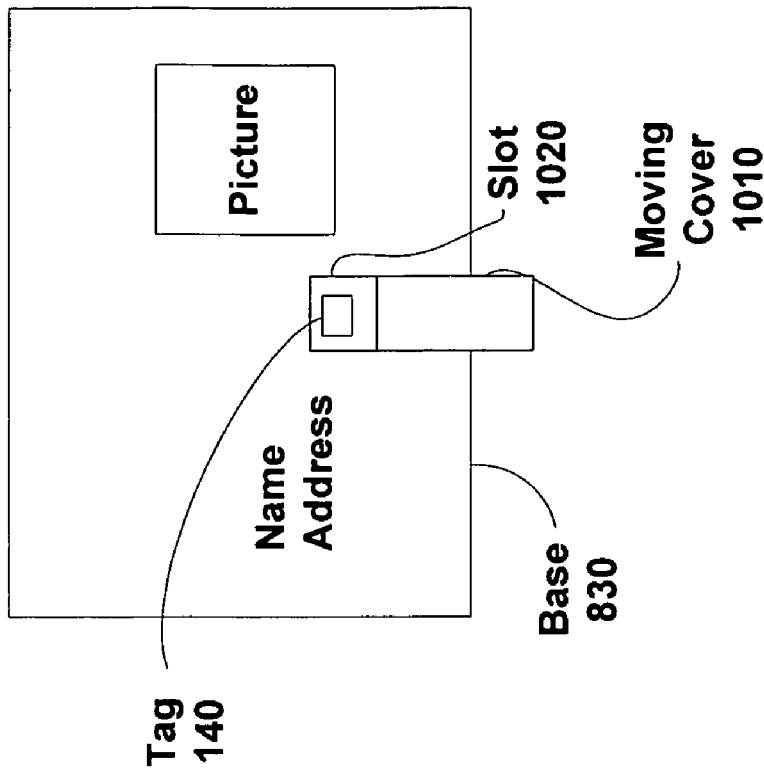
FIGS. 10A and 10B illustrate an ID similar to that shown in FIGS. 8 and 9 except that the cover is configured to fit into the base, according to various embodiments of the invention.
Figure 10A:
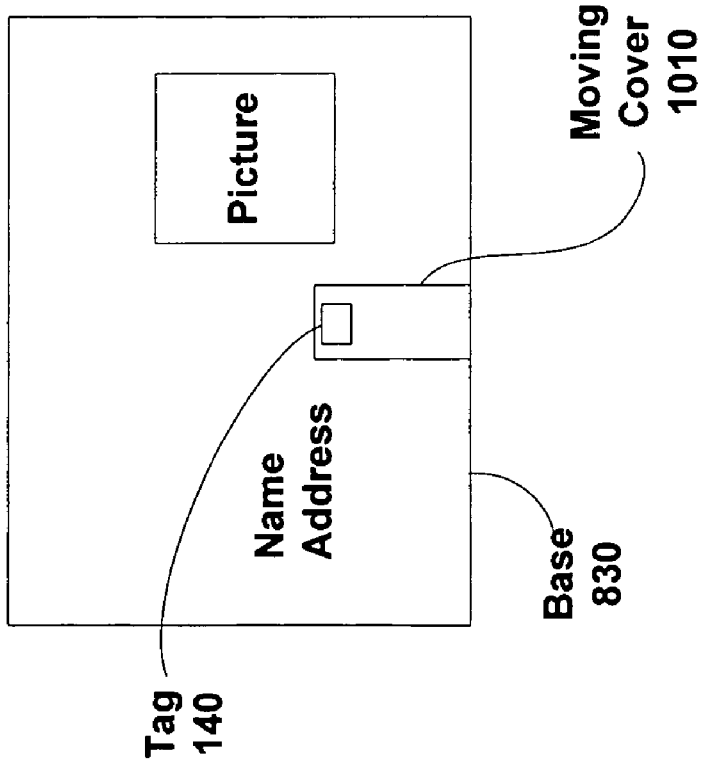

FIGS. 10A and 10B illustrate an ID similar to that shown in FIGS. 8 and 9 except that Cover 820 is configured to fit into Base 839, or visa versa. In the example shown, Cover 820 slides into and out of a slot in Base 830 and thus shields and exposes, respectively, RFID Tag 140. This embodiment may include an item to be worn such as a medical alert bracelet, an identity tag, a ring, clothing, glasses, or the like. For example, in the case of a medical alert bracelet, the bracelet includes an RFID tag (having medical information) that is only readable when a cover element of the bracelet is opened to expose the RFID tag to an RFID tag reader. When the cover is opened medical personal can read data from the RFID tag. When the cover is closed the medical information is shielded from being read by unauthorized persons and is thus kept confidential.

One embodiment of the invention includes the credit card (16) and case having sides (12) and (14) as illustrated in U.S. patent application 2004/0117514. In this embodiment, credit card (16) further (additionally) includes an RFID Tag 140 and sides (12) and/or (14) n further include RF shielding, or visa versa. The credit card may be replaced by an alternative type of ID device, e.g., a driver's license, debit card, or others discussed herein.

On embodiment of the invention includes the credit card (3) and holder (1) as illustrated in U.S. patent application 2005/0011776. In this embodiment, credit card (3) further includes an RFID Tag 140 and the holder (1) further includes RF shielding. The credit card may be replaced by an alternative type of ID device, e.g., a driver's license, debit card, or the like.

One embodiment of the invention includes the carrying case taught in U.S. patent application 2004/0256469, wherein the carrying case further includes RF shielding.

One embodiment of the invention includes the credit card and pivoting case described in U.S. patent application 2004/0237360, wherein an RFID tag is included in one part (e.g., the credit card) and shielding in another part (e.g., the case). Thus, when the credit card is pivoted into the case the RFID tag is shielded. One embodiment of the invention includes a credit card and case illustrated in FIG. 10 of U.S. patent application 2004/0237360. In this embodiment, the credit card includes an RFID Tag 140 and the case includes shielding. The credit card may be replaced by an alternative type of ID device, e.g., a driver's license, debit card, or the like.

One embodiment of the invention includes the security wallet illustrated in U.S. Pat. No. 4,744,497, wherein the security wallet further includes RFID shielding.

Various embodiments of the invention include the foldable transaction cards illustrated in US. Patent Applications 2004/0169087 and 2004/0089724, wherein shielding is further included in one side of the fold while RFID Tag 140 is further included in the other side. RFID Tag 140 is shielded when the transaction card is folded closed and unshielded when it is open.

Various embodiments of the invention include the several different folding cards illustrated in U.S. Pat. No. 5,700,037 and Application 2005/0205665. Wherein these cards further include RFID Tag 140 in one part and shielding in another part, such that in one fold position RFID Tag 140 is shielded by the shielding, and in another fold position RFID Tag 140 is un-shielded.

One embodiment of the invention includes the credit card case illustrated in U.S. patent application 2002/0117243. Where in the credit card case further includes shielding configured to shield an rfid enabled credit card or other identification device.

Figure 11:
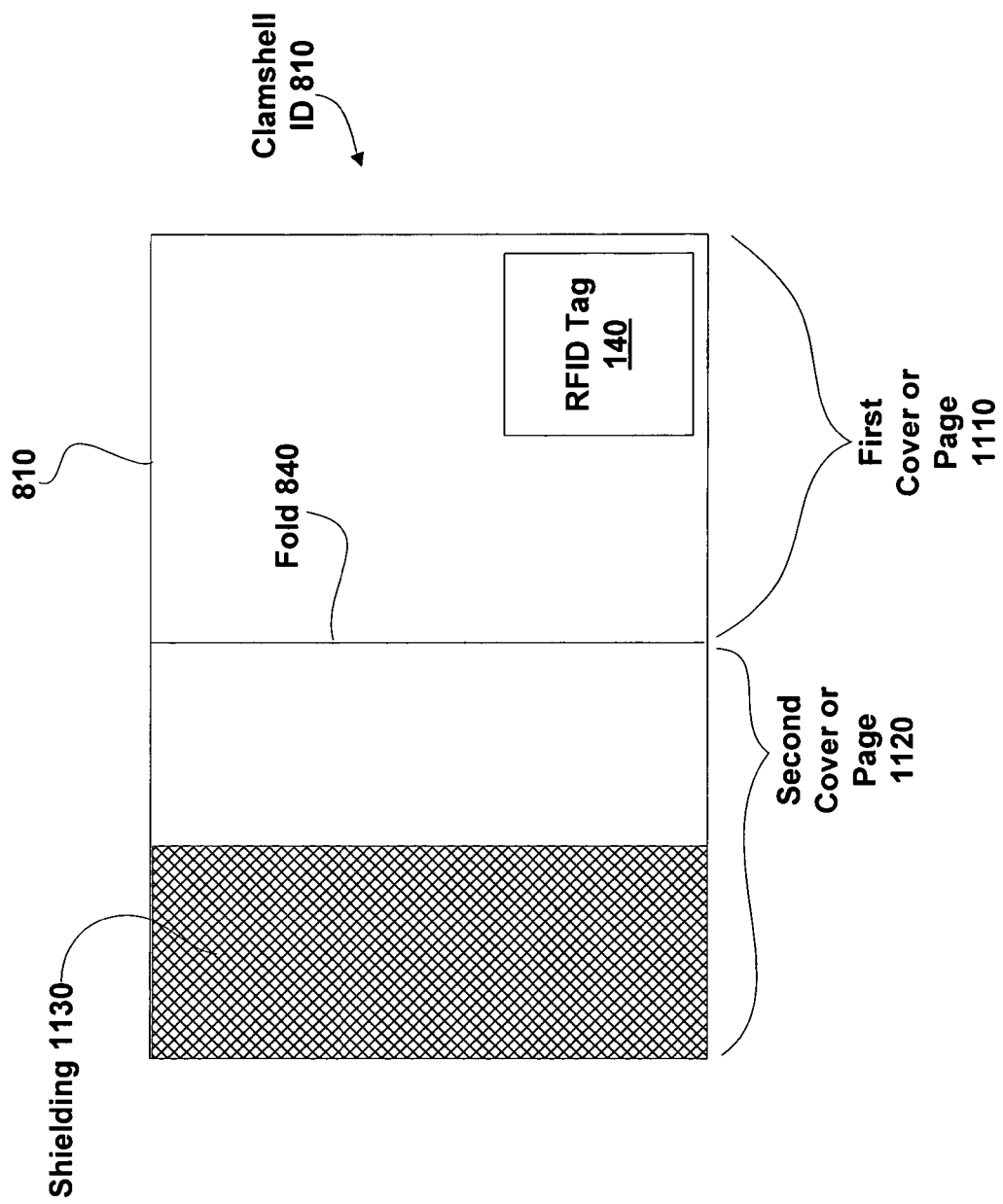
FIG. 11 illustrates further detail of some embodiments of a clamshell ID having a first cover and second cover separated by a fold.

FIG. 11 illustrates further detail of some embodiments of Clamshell ID 810, having a First Cover 1110 and a Second Cover 1120 separated by Fold 840. First Cover 1110 and a Second Cover 1120 may be, for example, Base 830 and Cover 820. Fold 840 can be a spine, hinge, crease, or the like. In alternative embodiments, First Cover 1110 and/or Second Cover 1120 can be embodied as a page or pages between covers of an identity document. Shielding 1130 is disposed as part of the second cover (e.g., or on or in an ID document cover or page). Shielding 1130 is optionally disposed away from fold 840 such that, when Clamshell ID 810 is open, the shielding as well separated from RFID Tag 140. In various embodiments, the separation between shielding 1130 and Fold 840 is greater than 5 mm, 10 mm, 15 mm, 20 mm, 25 mm or 30 mm. Likewise, RFID Tag 140 is optionally disposed away from Fold 830. In various embodiments, the separation between RFID Tag 140 (including antenna) and Fold 840 is greater than 5 mm, 10 mm, 15 mm, 20 mm, 25 mm or 30 mm. Alternatively, RFID Tag 140 and/or Shielding 1130 may be disposed to abut Fold 840.

Figure 12:
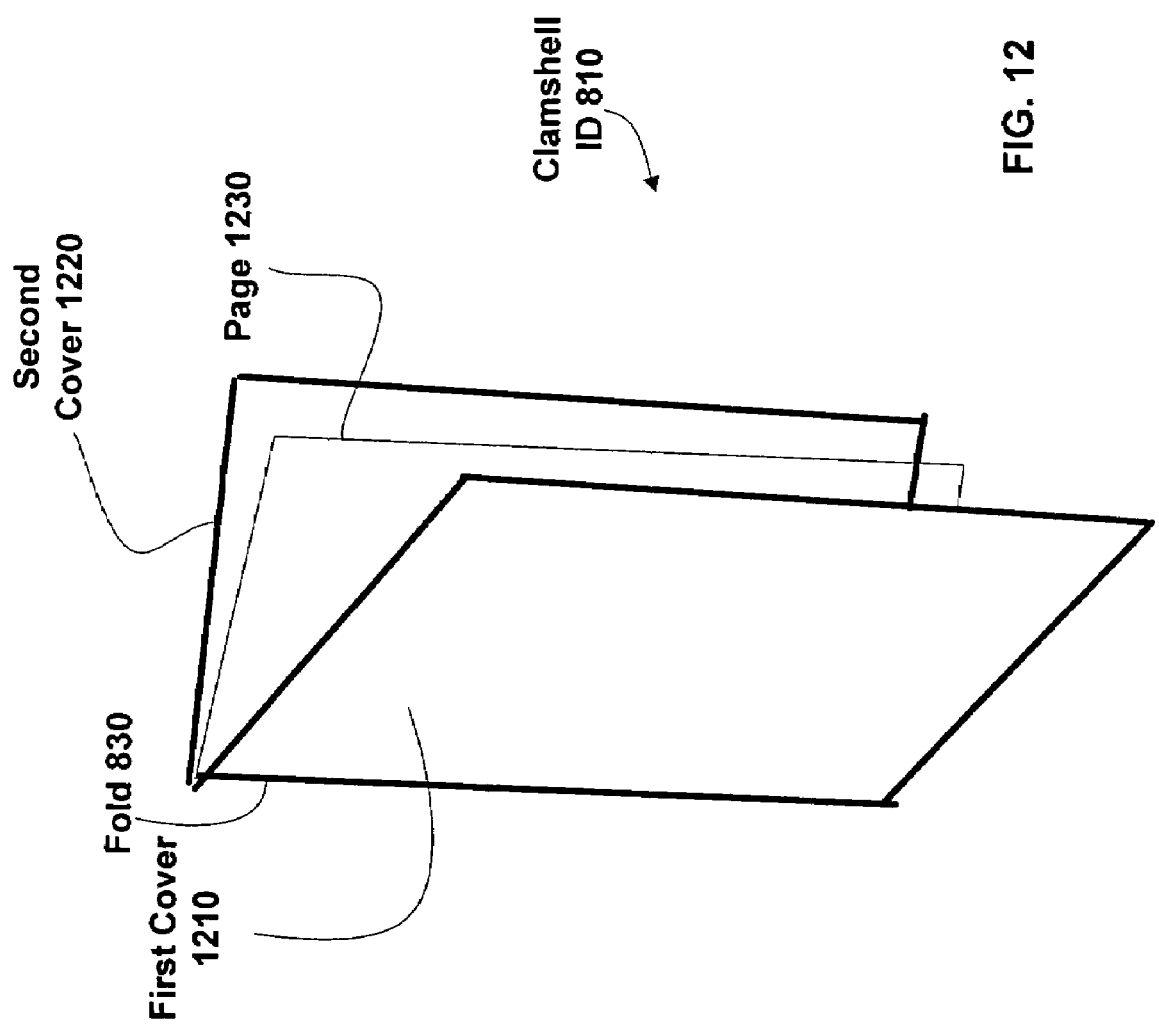
FIG. 12 illustrates further embodiments of a clamshell ID including a first cover and second cover separated by a fold.

FIG. 12 illustrates embodiments of Clamshell ID 810 including a First Cover 1210 and a Second Cover 1220 separated by Fold 830. These embodiments further include a Page 1230 disposed between First Cover 1210 and Second Cover 1220. Page 1230 includes RFID Tag 140 or Shielding 1130. For example, these embodiments of Clamshell ID 810 can include a passport including a photograph and identity information within an inside surface (facing toward Page 1230) of First Cover 1210, RFID Tag 140 within First Cover 1210 or Second Cover 1220, and Shielding 1130 within Page 1230. RFID Tag 140 can be shielded and un-shielded by moving Page 1230 close to or away from RFID Tag 140. In embodiments, wherein RFID Tag 140 is included in Second Cover 1220, RFID Tag 140 is shielded when Page 1230 is held close to Second Cover 1220. In this position is may be possible to view the photograph and identity information within the inside surface of First Cover 1210 without un-shielding RFID Tag 140. When Page 1230 is moved away from Second Cover 1220 then RFID Tag 140 is unshielded.

By including the RF Shielding 1130 with one of the one or more Page 1230, Clamshell ID 810 can be opened without necessarily removing Shielding 1130 from the vicinity of RFID Tag 140. For example, if RFID Tag 140 is disposed within the back cover, and Clamshell ID 810 is opened such that the inside of the First Cover 1210 is visible, Page 1230 including Shielding 1130 could remain adjacent to Second Cover 1220 and thus limit communication with the RFID Tag 140. To allow communication with RFID Tag 130 Page 1230 including Shielding 1130 is turned such that it moves away from Second Cover 1220. The Shielding 1130 may be attached to Page 1230 or be included within Page 1230. For example, Shielding 1130 may be laminated within Page 1230, be sewn on Page 1230, be glued on Page 1230, be within the material of Page 1230, or otherwise be connected to Page 1230. In various embodiments, Shielding 1130 includes a wire mesh, metallic fibers, metallic particles, metallic thread, or the like. Shielding is optionally attached to a binding of Clamshell ID 810 as Page 1230. Page 1230 is optionally bound to Clamshell ID by stable, pin, wire, thread, adhesive, laminate, or the like.

Figure 13:
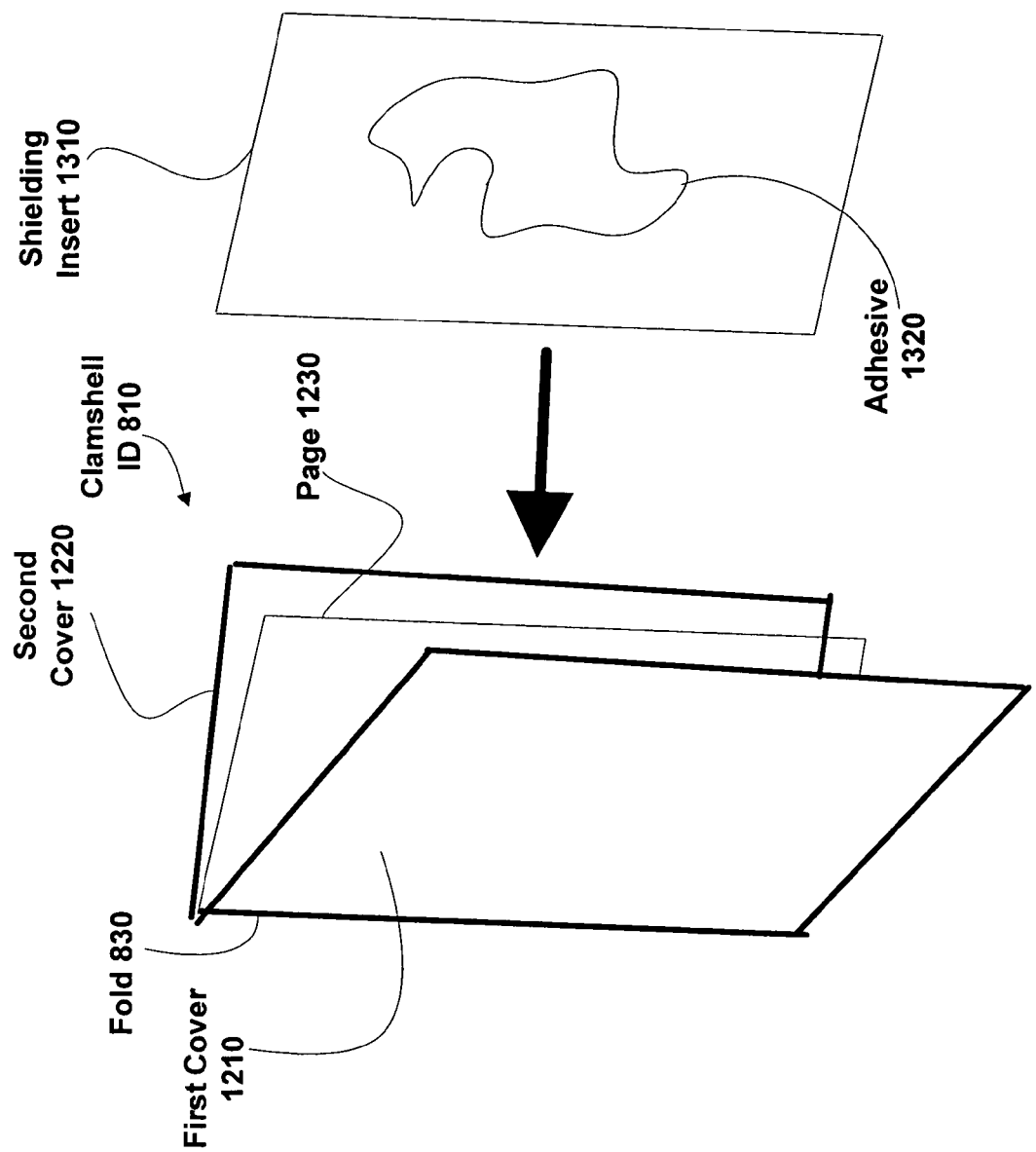
FIG. 13 illustrates a clamshell ID wherein shielding is added to a page, according to various embodiments of the invention.

FIG. 13 illustrates embodiments of Clamshell ID 810 wherein Shielding 1130 is added to Page 1230 following assembly of Clamshell ID. In these embodiments, Shielding 1130 is included in a Shielding Insert 1310. Shielding Insert 1310 optionally includes Adhesive 1320 or some other mechanism for attaching Shielding Insert 1310 to Page 1230. The attachment of Shielding Insert 1310 to Page 1230 can be permanent or temporary (e.g., Shielding Insert 1310 may be removable). In various embodiments, Shielding Insert 1310 includes a metal plate, wire mesh, metallic fibers, metallic particles, metallic thread, or other forms of shielding.

The size of Shielding Insert 1310 is optionally the same as or slightly smaller then a European Union Passport, a Japanese Passport, a Chinese Passport, a United States Passport, or the like. Alternatively, in various embodiments, Shielding Insert 1310 is configured in size such that it can be attached to Clamshell ID 810 at least greater than 5 mm, 10 mm, 15 mm, 20 mm, 25 mm or 30 mm from Fold 830. For example, Shielding Insert 1310 may be configured to attach to Page 1230 such that Shielding Insert 1310 extends from near an outer edge (opposite Fold 830) of Page 1230 to within 10 mm of Fold 830.

Figure 14:
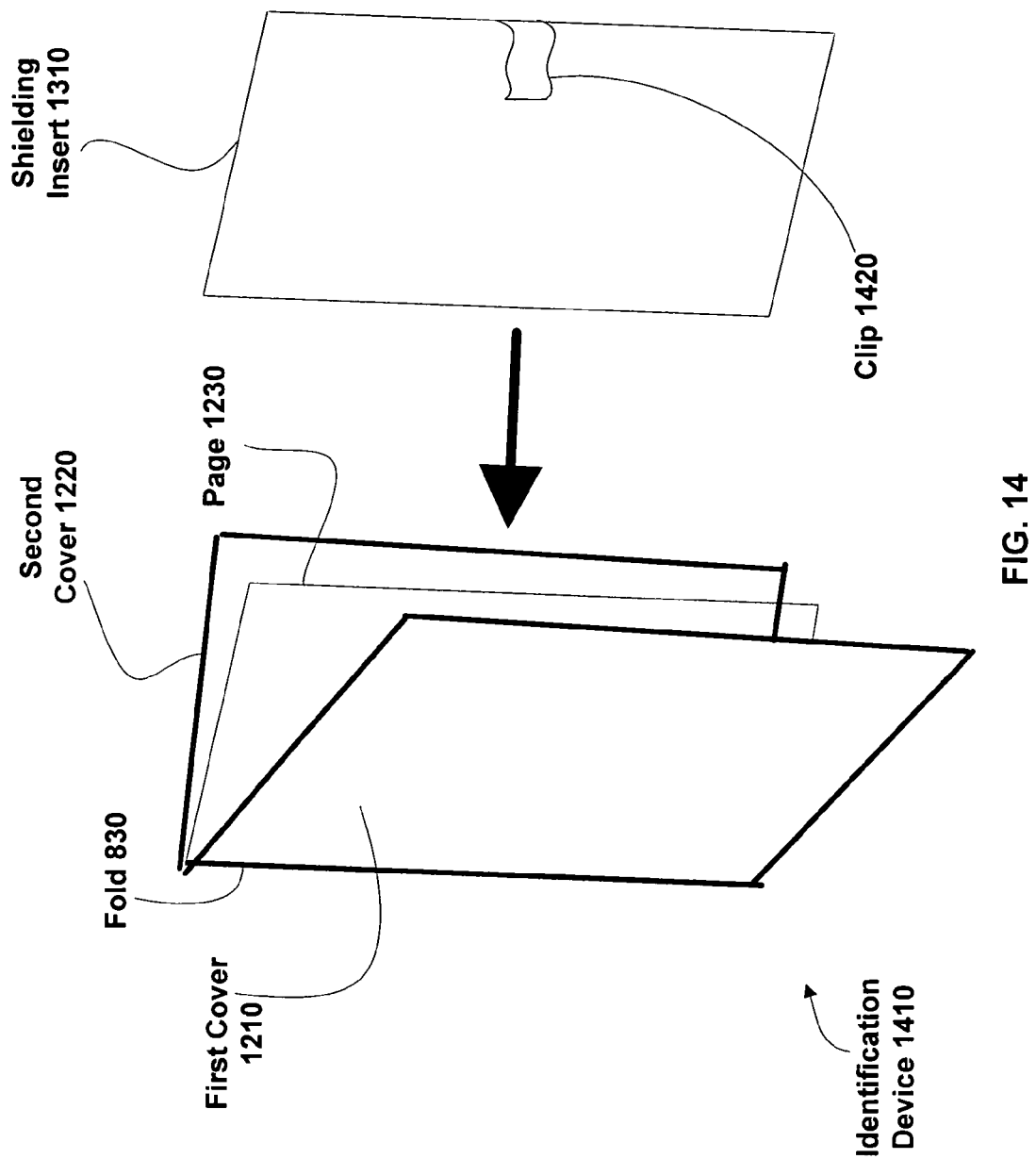
FIG. 14 illustrates an identification device, according to various embodiments of the invention.

FIG. 14 illustrates embodiments of an Identification Device 1410, such as Clamshell ID 810. In these embodiments, Shielding Insert 1310 includes one or more clips 1420, clamp, pin, slot, rivet, or other mechanism configured for, optionally temporary, attaching Shielding Insert 1310 to Identification Device 1410. In some embodiments Clip 1420 is replaced by a slot configured to receive that part of Identification Device 1410 including an RFID tag. Shielding Insert 1320 is optionally pivotally connected to Identification Device 1210. In the embodiments illustrated by FIG. 14, Fold 830, Second Cover 1220 and Page 1230 are optional. For example, Identification Device 1410 can be a single piece driver's license, credit card, etc. (without separate front and back covers) including RFID Tag 140. Shielding Insert 1310 is configured to be attached to First Cover 1210, Page 1230, and/or Second Cover 1220. In these embodiments Page 1230 need not include shielding. In some embodiments, Shielding Insert 1310 may be attached to that part of Identification Device 1410 that includes RFID Tag 140. In these embodiments, Shielding Insert 1310 is inserted to shield RFID Tag 140 and removed in order to un-shield RFID Tag 140. In some embodiments, Shielding Insert 1310 includes a flat metal plate configured to fit within a passport, e.g., a passport issued by the United States, a European Country, or an Asian Country. In these embodiments, the size of shielding insert may be similar to or slightly smaller than the dimensions of the passport. In some embodiments, Shielding Insert 1310 can include an attachment device, such as Clip 1420, on more than one side (face). As such, Shielding Insert 1310 may be configured to shield and RFID enabled driver's license on one side and an RFID enabled credit card on the other side. Shielding Insert 1310 is optionally approximately the size of a driver's license or credit card. In some embodiments, Shielding Insert 1310 has height and width dimensions similar to or smaller than a page between the front cove and the back cover. Shielding Insert 1310 is optionally thin and optionally flexible.

Figure 15:
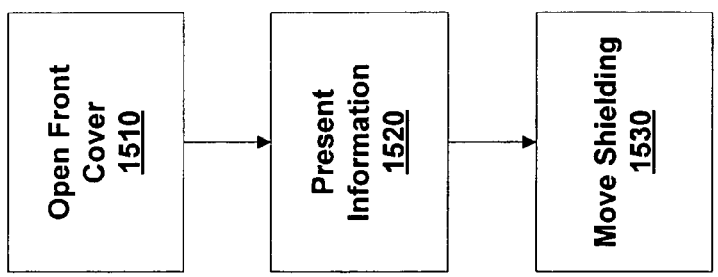
FIG. 15 illustrates a method of allowing communication to an RFID tag, according to various embodiments of the invention.

As illustrated in FIG. 15, some embodiments of the invention include a method of allowing communication to an RFID tag. The method includes a Step 1510 of opening a front cover of an identification device, such as Clamshell ID 810 or Identification Device 1410, in order to make information included on the inside of the front cover visible, an RF shielding page being kept in proximity of the back cover such that an RF tag within the back cover is unreadable. The RF shielding page can be for example an instance of Page 1230 or a page with Shielding Insert 1310 attached. The method further includes a Step 1520 of visually presenting the information on the inside of the front cover. The information can include a name, citizenship, photograph, identification number, or the like. A step 1530 includes turning the shielding page away from the back cover such that the RFID tag becomes un-shielded and can communicate with a reader. The shielding page is a page, between the front cover and the back cover, that includes or is attached to RF shielding configured to limit communication with the RFID tag. In alternative embodiments of this method, the rolls of the front cover and back cover are reversed.

Figure 16:
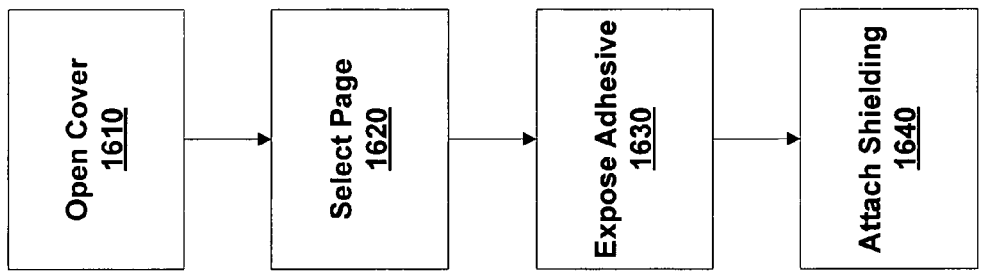
FIG. 16 illustrates a method of modifying an RFID enabled identification device, according to various embodiments of the invention.

As illustrated in FIG. 16, some embodiments of the invention include a method of modifying an RFID enabled identification device, e.g., Identification Device 1410. This method includes, a Step 1610 of opening the identification device by turning a back cover away from a front cover; a Step 1620 of selecting a page disposed (optionally bound) between the front cover and the back cover; an optional Step 1630 of exposing an adhesive surface on an RF shielding insert, the RF shielding configured to limit RF communication between an RFID tag included in the identification device and a reader; and a Step 1640 of attaching the RF shielding insert to the selected page using the exposed adhesive. In alternative embodiments, the adhesive is optionally replaced by a clip, clamp, pin, slot, or other mechanism configured for temporary attachment to the identification device. The identification device is optionally a passport, driver's license, immigration document, national identity document, or other identification device discussed herein. The RF shielding insert is optionally sized (as discussed elsewhere herein) such that it is disposed at a distance from a fold in the identification device.

Figure 17:
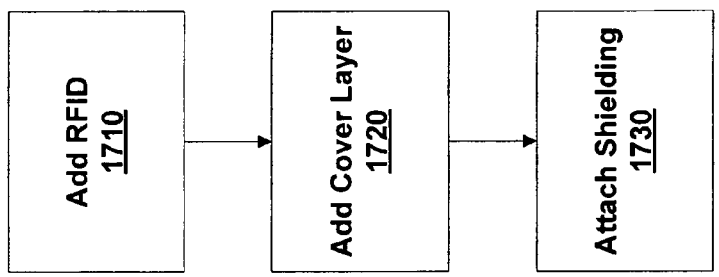
FIG. 17 illustrates a method of making an identity device including, according to various embodiments of the invention.

As illustrated by FIG. 17, one embodiment of the invention includes a method of making an identity device including: a Step 1710 of adding an RFID tag to a first cover layer; a Step 1720 of adding a second cover layer such that the RFID tag is disposed between the first cover layer and the second cover layer; and a Step 1730 of a attaching an RF shield to the combined first cover layer and second cover layer. The RF shield is optionally attached as a page configured to be disposed between to parts of the combined first cover layer and second cover layer when the combination is folded. The RF shield is optionally temporally attached to the combined first cover layer and second cover layer.

Figure 18:
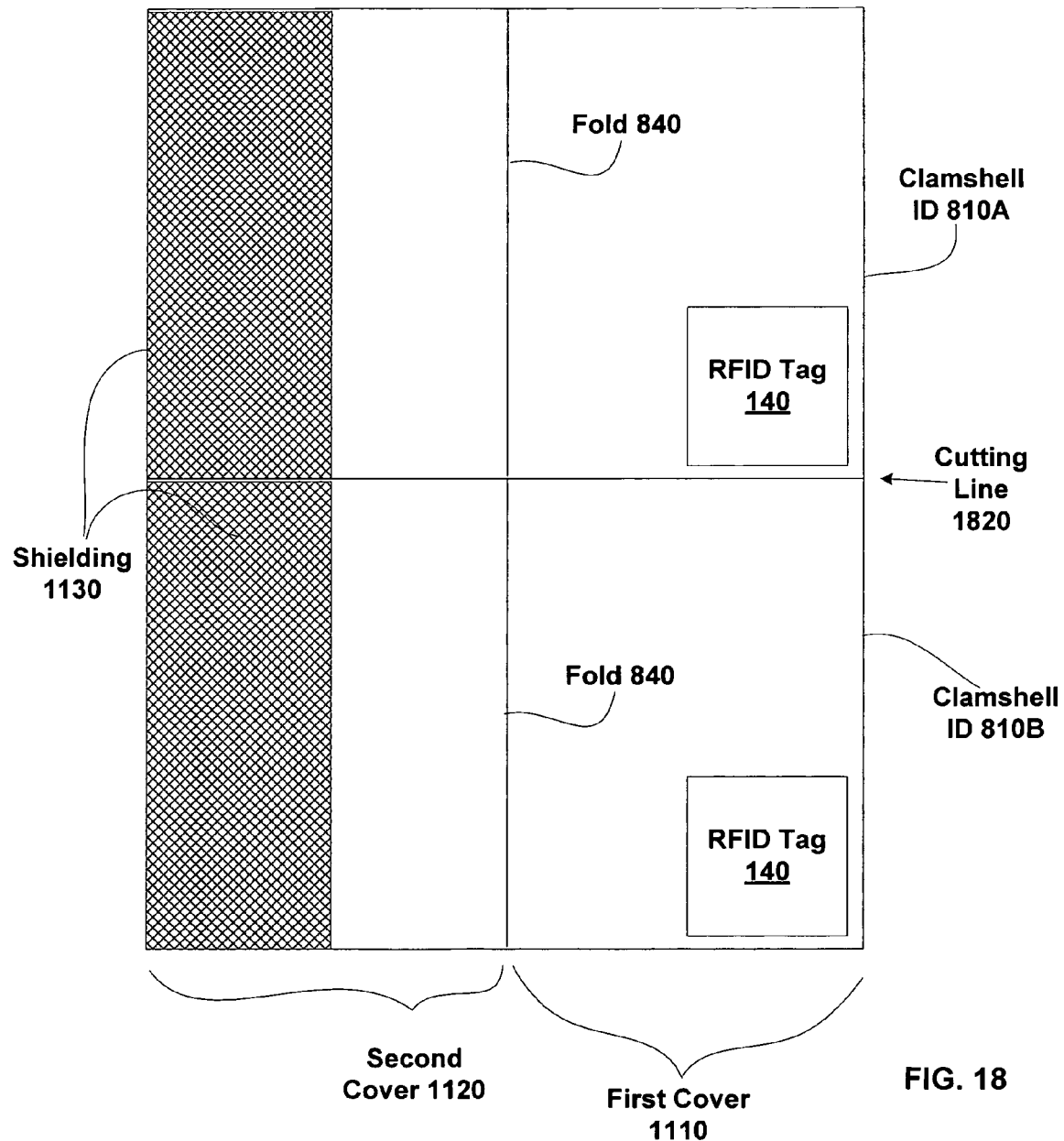
FIG. 18 is a block diagram illustrating a stage in the manufacture of an identification device, according to various embodiments of the invention.

FIG. 18 is a block diagram illustrating the manufacture of an identification device, such as a passport. At one stage in the manufacturing process Shielding 1130 is dispensed in the form of a strip. The strip is laid down over what will be several separate identification devices when the manufacturing is completed. A plurality of RFID Tags 140 are deposited. The assembled material, including shielding is cut along a Cutting Line 1820 (cutting area) to separate the locations where the RFID Tags 140 are deposited or to be deposited. As a result a plurality of identity documents are produced. The cut along Cutting Line 1820 occurs after Shielding 1130 is laid down. Pages are optionally added to the assembled material prior to cutting.

Figure 19:
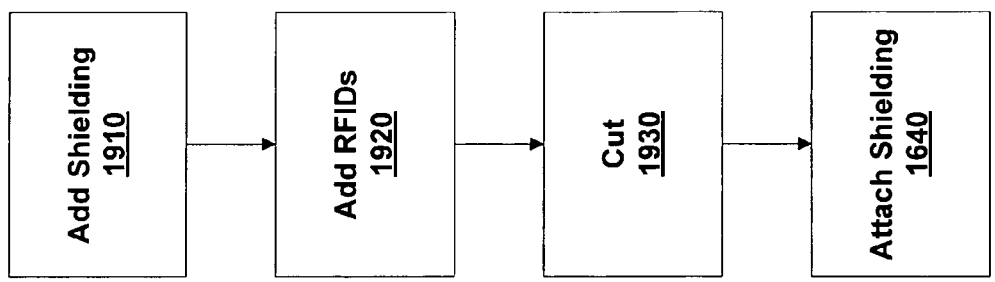
FIG. 19 illustrates the method of manufacturing an identification device, according to various embodiments of the invention.

FIG. 19 illustrates the method of illustrating an identification device as shown in FIG. 18. In an Add Shielding Step 1910, shielding is added to an area of a cover that will become a first identification device and a second identification device. In an Add RFIDs Step 1920, a first RFID tag is added to that part of the cover that will become the first identification device and a second RFID tag is added to that part of the cover that will become the second identification device. In a Cut Step 1930, the cover is cut to separate that part that will become the first identification device and that part that will become the second identification device. Cut Step 1930 includes cutting the shielding added in Add Shielding Step 1910.

FIG. 20 illustrates an RFID reader system configured to read Clamshell ID 810 e.g., an RFID enabled passport including shielding. Spacing between an RFID Reader 2010 and a Base 2020 is configured to form a Passport Slot 2030. RFID Reader 2010 is configured to read Clamshell ID 810. The height of Passport Slot 2030 is configured such that Clamshell ID 810 is sufficiently open when passed though Passport Slot 2030 between the RFID Reader 2010 and Base 2020. E.g., Passport Slot 2030 is configured such that, in order to pass through Passport Slot 2030 Clamshell ID 810 cannot be partially open such that shielding within Clamshell ID 810 could block the communication between RFID Reader 2010 and the RFID tag included in Clamshell ID 810. The width of the passport slot is optionally configured to assure that the shielding is not disposed between the RFID reader and the RFID tag.

FIG. 21 illustrates an RFID reader system including more than one RFID readers (RFID Reader 2010A, RFID Reader 1010B, and optionally RFID Reader 1010C). The more than one RFID readers are disposed such that any shielding within an ID is never within the line of sites between all of the one or more RFID readers and an RFID tag in a reading volume. And in addition, the more than one RFID readers are disposed such that the angle between an antenna of the RFID tag is at least one of the RFID readers is favorable for communicating between the RFID tag and RFID reader. Achieving both or these criteria may require three or more RFID readers. In alternative embodiments, this system may include fewer or more RFID readers than illustrated. The illustrated readers optionally surround a walk through reading volume.

Several embodiments are specifically illustrated and/or described herein. However, it will be appreciated that modifications and variations are covered by the above teachings and within the scope of the appended claims without departing from the spirit and intended scope thereof. For example, an RFID key device may include more than one RFID tag and moving of shielding may be used to determine which RFID tag can communicate with readers. The RFID tags discussed herein may include active or passive contactless circuits configured to transmit identification information.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A passport comprising:
   an RFID tag configured to transmit identifying information;
   a surface configured to visually display the identifying information; and
   a cover including a first part and a second part separated by a fold, the first part including the RFID tag and the second part including a radio frequency shielding configured to shield the RFID tag when the cover is closed, and configured to allow reading of the RFID tag when the cover is open, the radio frequency shielding including metallic fibers disposed within the second part.

2. The shielding device of claim 1, wherein the shielding is configured to be attached to the device using adhesive.

3. The passport of claim 1, wherein the metallic fibers are laminated between layers of the cover.

4. The passport of claim 1, wherein the first part does not include shielding.

5. The passport of claim 1, wherein the first part does include shielding.

6. The passport of claim 1, wherein the RFID tag is disposed at least 10 mm from the fold.

7. The passport of claim 1, wherein the radio frequency shielding is transparent.

8. The passport of claim 1, wherein the page is transparent.

* * * * *